United States Patent [19]

Yamane

[11] Patent Number: 5,661,523
[45] Date of Patent: Aug. 26, 1997

[54] MOVING PICTURE CODING METHOD AND AN APPARATUS THEREFOR

[75] Inventor: Yasuhiko Yamane, Osaka-fu, Japan

[73] Assignee: Matsushita Electric Industrial Co., Ltd., Osaka, Japan

[21] Appl. No.: 421,520

[22] Filed: Apr. 13, 1995

[30] Foreign Application Priority Data

Apr. 14, 1994 [JP] Japan .................. 075861

[51] Int. Cl.$^6$ .................. H04N 7/36
[52] U.S. Cl. .................. 348/390; 348/415; 348/405
[58] Field of Search .................. 358/335, 42; 360/10.1, 360/10.3; 348/384, 390, 387, 388, 397, 400, 401, 403, 404, 405, 409, 419, 420, 416, 423, 415; 382/236, 238, 239

[56] References Cited

U.S. PATENT DOCUMENTS

| | | | |
|---|---|---|---|
| 5,144,425 | 9/1992 | Joseph | 348/419 |
| 5,461,420 | 10/1995 | Yonemitsu et al. | 348/416 |
| 5,515,107 | 5/1996 | Chiang et al. | 348/423 |

OTHER PUBLICATIONS

International Prganisation for Standardisation; ISO–IEC/JTC/SC29/WG11, Experts Groups on ATM Video Coding, pp. 56–59, dated Jul. 31, 1992.

*Primary Examiner*—Amelia Au
*Attorney, Agent, or Firm*—Greenblum & Bernstein P.L.C.

[57] ABSTRACT

A moving picture coding apparatus for compressing moving picture video signal to a target amount "TARGET" which has an optimized size to properly fit in a disc. The moving picture video signal is divided into a plurality of groups of pictures (GOPs), each GOP has a plurality of frames. During a first cycle operation, the video signal is compressed by DCT unit and quantizer using a fixed parameter from a contant generator, and the following amounts are measured: compressed data amount "GOP(i)" in each GOP; compressed data amount "Frame(j)" in-each frame; and compressed data amount "GOP_Total" in total GOPs. Using these measured amounts, appropriate size for each frame is calculated in a calculator. Then, in the second cycle operation, the video signal for each frame is compressed according to the calculated appropriate size, and recorded on a disc.

38 Claims, 13 Drawing Sheets

Fig.5 PRIOR ART

LOW → HIGH

|   |   |   |   |   |   |   |   |
|---|---|---|---|---|---|---|---|
| 8 | 16 | 19 | 22 | 26 | 27 | 29 | 34 |
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 35 | 40 | 48 | 58 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

↓ HIGH

Fig.6 PRIOR ART

|   |   |   |   |   |   |   |   |
|---|---|---|---|---|---|---|---|
| 16 | 32 | 38 | 44 | 52 | 54 | 58 | 68 |
| 32 | 32 | 44 | 48 | 52 | 58 | 68 | 74 |
| 38 | 44 | 52 | 54 | 58 | 68 | 68 | 76 |
| 44 | 44 | 52 | 54 | 58 | 64 | 74 | 80 |
| 44 | 52 | 54 | 58 | 70 | 80 | 96 | 116 |
| 52 | 54 | 58 | 64 | 70 | 80 | 98 | 116 |
| 52 | 54 | 58 | 68 | 76 | 92 | 112 | 138 |
| 54 | 58 | 70 | 76 | 92 | 112 | 138 | 166 |

Fig.13

| GOP 1 | GOP 2 | GOP 3 | GOP 4 | GOP 5 | GOP 6 | GOP 7 |
|---|---|---|---|---|---|---|
| IBBP | BBIBBPBBP | BBIBBPBBP | BBIBBPBBP | BBIBBPBBP | BBIBBPBBP | BBIBBBP |

Fig.14

| GOP 1 | GOP 2 | GOP 3 | GOP 4 |
|---|---|---|---|
| IBBP | BBIBBPBBPBBPBBP | BBIBBPBBP | BBIBBPBBPBBPBBPBBP |

Fig.16A

| 8 | 16 | 19 | 22 | 26 | 27 | 29 | 34 |
|---|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

QUANTIZATION TABLE 1 FOR I-PICTURE

Fig.16B

| 8 | 16 | 16 | 16 | 16 | 16 | 16 | 16 |
|---|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

QUANTIZATION TABLE 2 FOR P-PICTURE

Fig.16C

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

QUANTIZATION TABLE 3 FOR B-PICTURE

Fig. 17A

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 35 | 40 | 48 | 58 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

QUANTIZATION TABLE 1 FOR I-PICTURE

Fig. 17B

| 8 | 16 | 16 | 16 | 16 | 16 | 16 | 16 |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

QUANTIZATION TABLE 2 FOR P-PICTURE AND B-PICTURE

Fig. 18

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 35 | 40 | 48 | 58 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

QUANTIZATION TABLE 1 FOR I-PICTURE, P-PICTURE AND B-PICTURE

MOVING PICTURE CODING METHOD AND AN APPARATUS THEREFOR

BACKGROUND OF THE INVENTION

1. Field of the Invention

The present invention relates to a moving picture coding method, and to a moving picture coding method appropriate to a moving picture coding recording and reproducing apparatus.

2. Description of the Prior Art

Numerous technologies have been developed in recent years for processing digitized moving pictures, including various methods of compressing and thereby reducing the amount of image data. Digital image compression is needed for efficient recording and transmission of digital moving pictures because of the inherently large amount of information resulting from the digitizing process. The extremely large volume of information recorded on digital video disks storing movies and similar subject matter, for example, necessitates efficient moving picture coding and decoding technologies.

One known moving picture coding method uses time base correlations to compress the image data, and may use specific correlations within or between image frames. Compared with intra-frame coding, coding using inter-frame correlations can achieve a higher compression rate, but when errors occur, a refresh operation for intra-frame coding at a predetermined cycle must be executed because the data is propagated on the time base.

FIG. 1 shows the relationship between predictive frames and processed frames in a method compressing moving pictures using time base correlations. There are three different kinds of frames, which are Intra frames I (I-picture frame or frame I), bidirectional interpolated frames B (B-picture frame or frame B) and predictive frames P (P-picture frame or frame P), which are produced in a pattern I,B,B,P,B,B, repeatedly, as shown in FIG. 1. The frame I includes one complete data for one frame and can reproduce one frame picture by itself. The frame B includes data for one frame, but cannot reproduce one frame picture by itself, but references the data from frame I and frame P. Similarly, the frame P includes data for one frame, but cannot reproduce one frame picture by itself, but references the data from frame P. Frames I are compressed using only the data correlations within that frame, and are used as the predictive frames when processing frames P and B. Frames P are coded by referencing the preceding frame I or the preceding frame P as the predictive frame. Frames B are coded by referencing, as the predictive frames, frames I and P before and after frame B, and the interpolated image generated from said frames I and P. The numbers following each coding type (I, B, P) indicate the display sequence of each frame in the chronological order. For example, frame I-0 is a type I frame in display sequence 0.

FIG. 2 shows the frames shown in FIG. 1 rearranged in the order processed. Frame coding starts with frame I-0, followed by frame P-3 using the already-coded frame I-0 as the predictive frame. Frames B-2 and B-1 are then frame interpolation coded using as the predictive frames the already-coded frames I-6 and P-3, and an interpolated image generated from frames I-0 and P-3. Frame I-6 is then coded by intra-frame coding, and frames B-4 and B-5 are frame interpolation coded using as the predictive frames the already-coded frames P-3 and I-6, and the interpolated image generated from frames P-3 and I-6. The coding sequence of each frame is thus determined based on the type of coding applied. Frame groups of plural frames are also defined as the processing unit for the coding operations, and are the data unit accessed for editing and special reproduction modes. In FIGS. 1 and 2, the first group of pictures GOP1 comprises frames 0–3, and the second GOP2 comprises frames 4–9; each of the subsequent GOPs similarly comprises six frames.

FIG. 3A shows the target coding level assigned to each GOP when coding each GOP in the sequence shown in FIG. 2. In a system manipulating moving pictures, it is necessary to keep the compression rate of the coded data to less than the maximum data transfer rate of the recording medium. In addition, if the recording time for a given recordable capacity is uniformly determined when recording images to a recording medium, it is also necessary to control the average transfer rate of the coded data. One means of controlling the coding rate is to maintain a constant average coding rate in each GOP. Specifically, as shown in FIG. 3A, a constant data amount is allocated to all GOPs in the input image.

To control the coding rate in the GOP, it is possible, for example, to provide a buffer at the output stage of the coding means, control the quantization pitches according to the amount of untransferred code in the buffer, and thereby control the data amount. Virtual buffers of differing capacities may also be created according to the type of the coding method in each frame, and the data amount controlled by these virtual buffers. This is because the amount of code required to obtain the same image quality increases according to the coding type (i.e., I>P>B), and this can therefore be used to change the size of the virtual buffers according to the type of frame processing, thereby preventing the buffer capacity from being too large or too small.

FIG. 4 is a block diagram of a conventional moving picture coding apparatus. As shown in FIG. 4, this moving picture coding apparatus comprises an image input means 400 for receiving image signal such as shown in FIG. 1 (frames shown in FIG. 1 are not yet compressed); a frame locator 401 for setting a pattern of alignment of I, P and B frames and setting the number of frames to be included in each GOP; a frame processing sequence controller 402 for changing the sequence of the frames according to the frame location information output from the frame locator 401 and for producing image signal such as shown in FIG. 2; a frame memory 412 having a capacity for storing at least two frames for temporarily holding the frame data that has to be shifted to a position in later sequence; a motion vector detector 403 for detecting in macro block units (e.g., 16×16 pixels) the motion vector between the newly received frame for processing (the "process frame") and the already-processed frame(s) used as the predictive frame of the process frame; a subtracter 404 for obtaining the difference between each block of the process frame and the predictive frame; a discrete cosine transform (DCT) unit 405 for applying a discrete cosine transformation (one type of orthogonal transformation) to the difference values; a quantizer 406 for quantizing the conversion coefficient obtained by the DCT unit 405, and also for producing a compressed frame signal; a coding unit 407 for coding (e.g., by Huffman coding) the compressed frame signal; a data amount controller 408 for controlling the coding of each frame in accordance with the frame type (I, P, B) data as obtained from the frame locator 401, and the quantization pitches based on the data amount generated by the coding unit 407 to maintain the instantaneous coded amount to be less than a predetermined maximum level; a dequantizer 409 and a DCT inverter 410 for temporarily expanding the compressed frame signal; and a frame memory 411 for storing the expanded frames.

The operation of the moving picture coding apparatus shown in FIG. 4 when coding with the frame coding sequence shown in FIG. 1 is described in detail below.

First, the frame processing sequence controller 402 passes frame I-0 to the DCT unit 405. Because frame I-0 is intra-frame coded, the motion vector detector 403 and subtracter 404 do not operate. The DCT unit 405 applies DCT processing by block unit (e.g., 8×8 pixels) to convert the signal to 8×8 matrix data expressed in the frequency domain. The quantizer 406 then quantizes the 8×8 matrix data using quantization tables such as shown in FIG. 5 for quantizing each value in the 8×8 matrix block unit. For example, using the table shown in FIG. 5, the first row first column data in the 8×8 matrix block unit is quantized as 0 when the data is between 0 and 7; as 1 when the data is between 8 and 15; as 2 when the data is between 16 and 17, and so on. In other words, the first row first column data is divided by 8 and rounded to obtain the quantized value.

In general, there is a strong correlation between adjacent image frames, and the energy is therefore concentrated in the low frequency component. Therefore, as shown in FIG. 5, the quantization pitches are made small in the low frequency components and larger in the high frequency components. The quantized coefficients are entropy coded by the coding unit 407, and the coded data is output from the coding unit 407. The data amount controller 408 controls the quantization pitches based on the frame type (I, P or B) and the instantaneous amount of coded data generated by the coding unit 407, and applies this information to the quantizer 406. For example, when the frame type is frame I, table shown in FIG. 5 is used, but when the frame type is frame P or frame B, the table shown in FIG. 6 is used. The target data amount of each frame in this case is calculated from the targeted average coding rate of the overall image, the number of frames in the GOP, and the coding method of the frames in the GOP. For example, the target data amount of frame I can be obtained from equation (1)

$$\text{Rate}*(\text{FrameGOP}/\text{FrameRate})*(\text{I\_ratio}/(\text{I\_ratio}*\text{I\_frame}+\text{P\_ratio}*\text{P\_frame}+\text{B\_ratio}*\text{I\_Frame})) \quad (1)$$

where Rate (bit/second) is the coding rate of the overall image; FrameRate (frames/second) is the frame rate; FrameGOP is the number of frames in each GOP; I_frame is the number of I frames in each GOP; P_frame is the number of P frames in each GOP; B_frame is the number of B frames in each GOP; and I_ratio:P_ratio:B_ratio is the ratio of I, P, and B frame code.

The target data amount of frames P and B can be similarly obtained from equations (2) and (3).

$$\text{Rate}*(\text{FrameGOP}/\text{FrameRate})*(\text{P\_ratio}/(\text{I\_ratio}*\text{I\_frame}+\text{P\_ratio}*\text{P\_frame}+\text{B\_ratio}*\text{I\_Frame})) \quad (2)$$

$$\text{Rate}*(\text{FrameGOP}/\text{FrameRate})*(\text{B\_ratio}/(\text{I\_ratio}*\text{I\_frame}+\text{P\_ratio}*\text{P\_frame}+\text{B\_ratio}*\text{I\_Frame})) \quad (3)$$

The data amount ratio (I_ratio:P_ratio:B_ratio) of each of I, P, and B frames may be controlled constantly for the entire input image, or the generated code ratio may be inherited by calculation based on the data amount of each frame generated during actual coding of the previous GOP (e.g., the preceding group on the time base).

The quantizer 406 calculates a new quantizer from the quantization table shown in FIG. 5 and the quantization pitches applied from the data amount controller 408, and quantizes each block. FIG. 6 shows the quantizer newly calculated by the quantizer 406 when the quantization pitch output from the data amount controller 408 is doubled.

Each compressed frame signal is expanded by dequantizer 409 and DCT inverter 410. More specifically, block coefficient quantized by the quantizer 406 is then dequantized by the dequantizer 409, the DCT operation is reversed by the DCT inverter 410, and the data is buffered to the frame memory 411 capable of storing two frame data. The buffered frame is used as the predictive frame in the next processing operation.

Frame P-3 is then read by the frame processing sequence controller 402. Because frame P-3 is a predictive frame using frame I-0 for the prediction, frame I-0 is read from the frame memory 411, and the motion vector between frame I-0 and frame P-3 is calculated by macro block unit (e.g., 16×16 pixels). Motion compensation is accomplished by the subtracter 404 using the motion vector calculated for each macro block, and the difference values between macro blocks are obtained. The DCT unit 405 applies DCT to each block, and the coding unit 407 applies entropy coding. The data amount controller 408 controls the quantization pitches based on the frame type, the target data amount calculated from equation (2), and the instantaneous amount of code generated by the coding unit 407, and applies this information to the quantizer 406. Each block coefficient quantized by the quantizer 406 is then dequantized by the dequantizer 409, the DCT operation is reversed by the DCT inverter 410, the motion vector between frame P-3 and frame I-0 is referenced and added to the block unit, and the data is buffered to the frame memory 411. The buffered frame is used as the predictive frame in the next processing operation. Coding thus proceeds according to the information from the frame locator 401.

With the conventional coding method thus described, however, there are problems as follows.

(1) The image quality may differ greatly between scenes containing significant motion or scene changes and scenes with relatively little motion or change, and there will also be severe image deterioration at scene changes, because the data amount assigned to each GOP is constant irrespective of the scene content.

(2) Image quality within single GOPs may also vary because the data amount assigned to each frame in the GOP is fixed or calculated from the data amount ratio between the present and previous GOPs.

SUMMARY OF THE INVENTION

Therefore, an object of the present invention, which relates to a coding method using the correlation between image frames and fields, is to suppress the variations in image quality resulting from differences in scene content, including scenes containing significant motion or scene changes and scenes with relatively little motion or change, and to improve the coding efficiency.

To achieve the aforementioned object, a moving picture coding method according to the present invention for compressing moving picture video signal to a target amount "TARGET" comprises the steps of:

(I) operating a first cycle operation, said first cycle operation comprising the steps of:
  (a) compressing said moving picture video signal with reference to a constant compression reference value;
  (b) counting compressed data amount "GOP(i)" in each GOP;
  (c) counting compressed data amount "Frame (j)" in each frame;

(d) counting compressed data amount "GOP_Total" in total GOPs;

(e) calculating a target data amount "TARGET_GOP (i)" for each GOP by a following equation (i), $$\text{TARGET\_GOP (i)} \propto \text{TARGET} * (\text{GOP(i)}/\text{GOP\_Total}) \quad \text{(i);}$$

and (f) calculating a target data amount "TARGET_Frame(j)" for each frame in respective GOP by a following equation (ii), $$\text{TARGET\_Frame(j)} \propto \text{TARGET\_GOP(i)} * \text{Frame(j)}/\text{GOP(i)} \quad \text{(ii);}$$

and (II) operating a second cycle operation, said second cycle operation comprising the steps of:

(g) compressing said moving picture video signal with reference to a variable compression reference value which is relative to said target data amount "TARGET_Frame(j)".

Also, according to the present invention, a moving picture coding method for compressing moving picture video signal to a target amount "TARGET" comprises the steps of:

(I) operating a first cycle operation, said first cycle operation comprising the steps of:

(a) compressing said moving picture video signal with reference to a constant compression reference value, (b) counting compressed data amount "GOP(i)" in each GOP;

(c) counting compressed data amount "Frame (i)" in each frame;

(d) counting a frame number "FrameGOP(i)" in each GOP;

(d) counting a total frame number "FrameTOTAL" in total GOPs;

(e) calculating a target data amount "TARGET_GOP(i)" for each GOP by a following equation (iii), $$\text{TARGET\_GOP(i)} \propto \text{TARGET} * (\text{FrameGOP(i)}/\text{FrameTotal}) \quad \text{(iii);}$$

and (f) calculating a target data amount "TARGET_Frame (J)" for each frame in respective GOP by a following equation (ii), $$\text{TARGET\_Frame (j)} \propto \text{TARGET\_GOP (i)} * \text{Frame (j)}/\text{GOP(i)} \quad \text{(ii);}$$

and (II) operating a second cycle operation, said second cycle operation comprising the steps of:

(g) compressing said moving picture video signal with reference to a variable compression reference value which is relative to said target data amount "TARGET_Frame(j)".

Furthermore, according to the present invention, a moving picture coding apparatus for compressing moving picture video signal to a target amount "TARGET" comprises:

compressing means for compressing said moving picture video signal;

constant generator means for generating a constant compression reference value;

first counting means for counting compressed data amount "GOP(i)" in each GOP;

second counting means for counting compressed data amount "Frame(j)" in each frame;

third counting means for counting compressed data amount "GOP_Total" in total GOPs;

first calculating means for calculating a target data amount "TARGET_GOP(i)" for each GOP by a following equation (i), $$\text{TARGET\_GOP (i)} \propto \text{TARGET} * (\text{GOP(i)}/\text{GOP\_Total}) \quad \text{(i);}$$

second calculating means for calculating a target data amount "TARGET_Frame(j)" for each frame in respective GOP by a following equation (ii), $$\text{TARGET\_Frame(j)} \propto \text{TARGET\_GOP(i)} * \text{Frame(j)}/\text{GOP(i)} \quad \text{(ii);}$$

and switching means for switching between a first position during a first cycle operation for compressing said moving picture video signal with the use of said constant compression reference value and a second position during a second cycle operation for compressing said moving picture video signal with the use of said target data amount "TARGET_Frame(j)" as the compression reference value, said first position acquired when said constant generator means is connected to said compressing means and, at the same time, an output of said compressing means is connected to said first, second and third counting means, and said second position acquired when said second calculating means is connected to said compressing means and, at the same time, an output of said compressing means is connected to a recording medium.

Still furthermore, according to the present invention, a moving picture coding apparatus for compressing moving picture video signal to a target amount "TARGET" comprises:

compressing means for compressing said moving picture video signal;

constant generator means for generating a constant compression reference value;

first counting means for counting compressed data amount "GOP(i)" in each GOP;

second counting means for counting compressed data amount "Frame(j)" in each frame;

third counting means for counting a frame number "FrameGOP(i)" in each GOP;

fourth counting means for counting a total frame number "FrameTOTAL" in total GOPs;

first calculating means calculating a target data amount "TARGET_GOP(i)" for each GOP by a following equation (iii), $$\text{TARGET\_GOP(i)} \propto \text{TARGET} * (\text{FrameGOP(i)}/\text{FrameTotal}) \quad \text{(iii);}$$

second calculating means for calculating a target data amount "TARGET_Frame (j)" for each frame in respective GOP by a following equation (ii), $$\text{TARGET\_Frame(j)} \propto \text{TARGET\_GOP(i)} * \text{Frame (j)}/\text{GOP(i)} \quad \text{(ii);}$$

and switching means for switching between a first position during a first cycle operation for compressing said moving picture video signal with the use of said constant compression reference value and a second position during a second cycle operation for compressing said moving picture video signal with the use of said target data amount "TARGET_Frame(j)" as the compression reference value, said first position acquired when said constant generator means is connected to said compressing means and, at the same time, an output of said compressing means is connected to said first, second and third counting means, and said second position acquired when said second calculating means is connected to said compressing means and, at the same time, an output of said compressing means is connected to a recording medium.

As described above, a coding method and coding apparatus according to the present invention can allocate the data amount according to the features of the input image while varying the data amount allocated to each GOP and the data amount allocated to each frame according to the scene content. It is therefore possible to suppress the variation in image quality resulting from differences in scene content, specifically differences in image quality between scenes containing significant movement or scene changes and scenes containing little or no movement. It is also possible to minimize the image deterioration occurring at scene changes.

BRIEF DESCRIPTION OF THE DRAWINGS

The present invention will become more fully understood from the detailed description given below and the accompanying diagrams wherein:

FIGS. 5 and 6 are diagrams showing quantization tables used in the coding apparatus of FIG. 4;

FIGS. 13 and 14 are diagrams showing methods of dividing the frames into GOPs employed in the apparatus of FIG. 7;

FIGS. 16A, 16B, 16C, 17A, 17B and 18 are diagrams showing possible quantization tables used in the coding apparatus of FIG. 7.

DESCRIPTION OF PREFERRED EMBODIMENTS

The preferred embodiments of the present invention are described below with reference to the accompanying figures.

Figure 7:
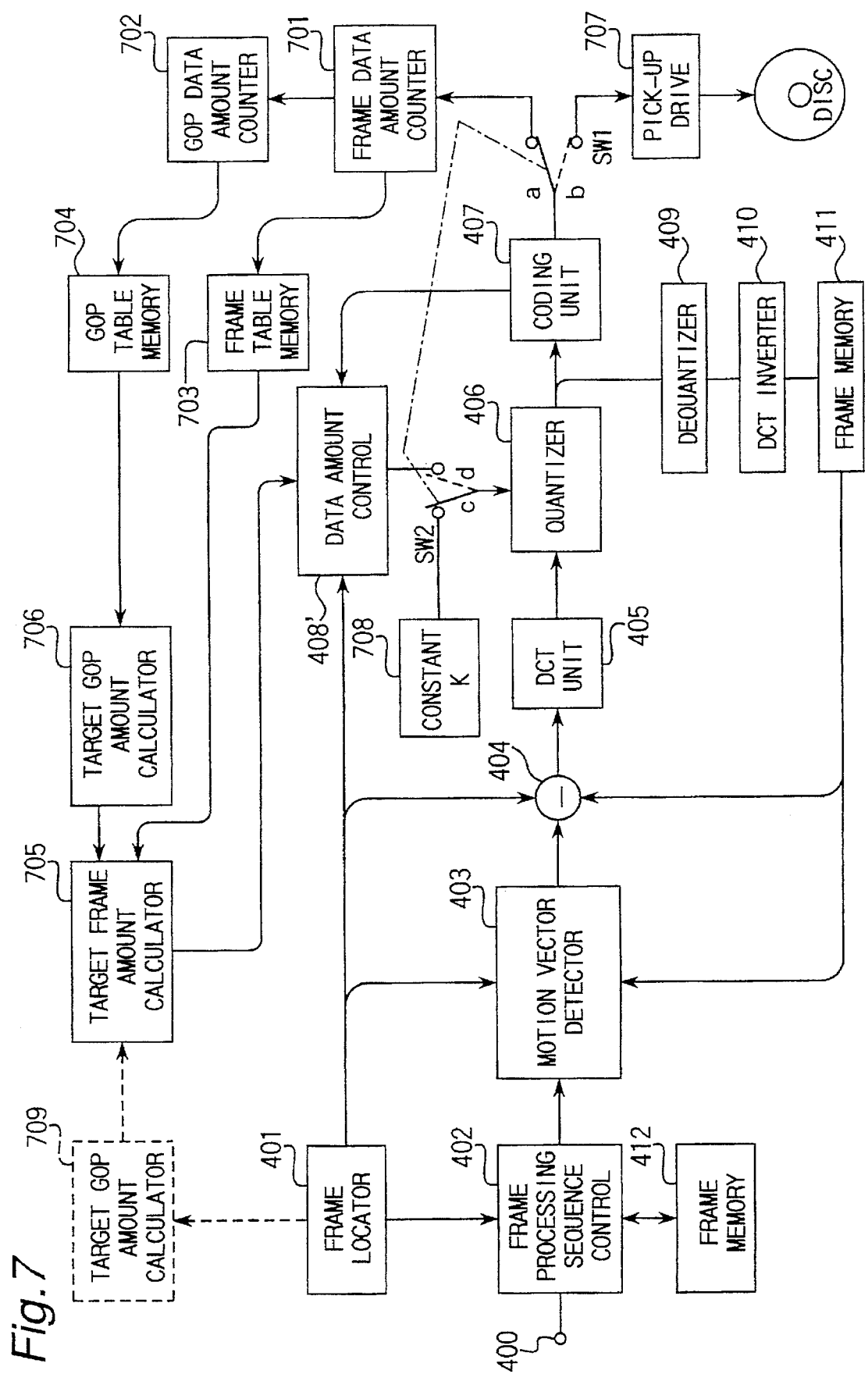
FIG. 7 is a block diagram of a coding apparatus according to the present invention.

Referring to FIG. 7 a block diagram of a coding apparatus according to the preferred embodiment of the present invention is shown.

The moving picture coding apparatus according to the present invention comprises an image input means 400 for receiving image signal such as shown in any one of FIG. 8, 9, 10, 11 and 12 (frames shown in these figures are not yet compressed); a frame locator 401 for setting a pattern of alignment of I, P and B frames and setting the number of frames to be included in each GOP; a frame processing sequence controller 402 for changing the sequence of the frames according to the frame location information output from the frame locator 401 and for producing image signal such as shown in FIG. 13 or 14; a frame memory 412 having a capacity for storing at least two frames for temporarily holding the frame data that has to be shifted to a position in later sequence; a motion vector detector 403 for detecting in macro block units (e.g., 16×16 pixels) the motion vector between the newly received frame for processing (the "process frame") and the already-processed frame(s) used as the predictive frame of the process frame; a subtracter 404 for obtaining the difference between each block of the process frame and the predictive frame; a discrete cosine transform (DCT) unit 405 for applying a discrete cosine transformation (one type of orthogonal transformation) to the difference values; a quantizer 406 for quantizing the conversion coefficient obtained by the DCT unit 405, and also for producing a compressed frame signal; a coding unit 407 for coding (e.g., by Huffman coding) the compressed frame signal; a data amount controller 408' for controlling the coding of each frame in accordance with the frame type (I, P, B) data as obtained from the frame locator 401, and the quantization pitches based on the data amount generated by the coding unit 407 to maintain the instantaneous coded amount to be less than a predetermined maximum level; a dequantizer 409 and a DCT inverter 410 for temporarily expanding the compressed frame signal; and a frame memory 411 for storing the expanded frames.

Figure 1:
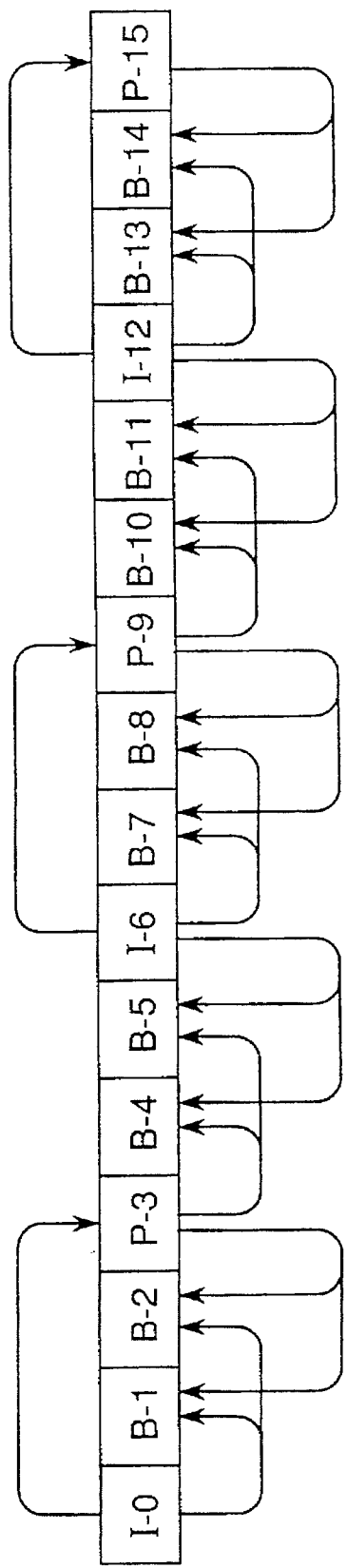
FIG. 1 is a diagram showing the frame coding method of the prior art.
Figure 2:
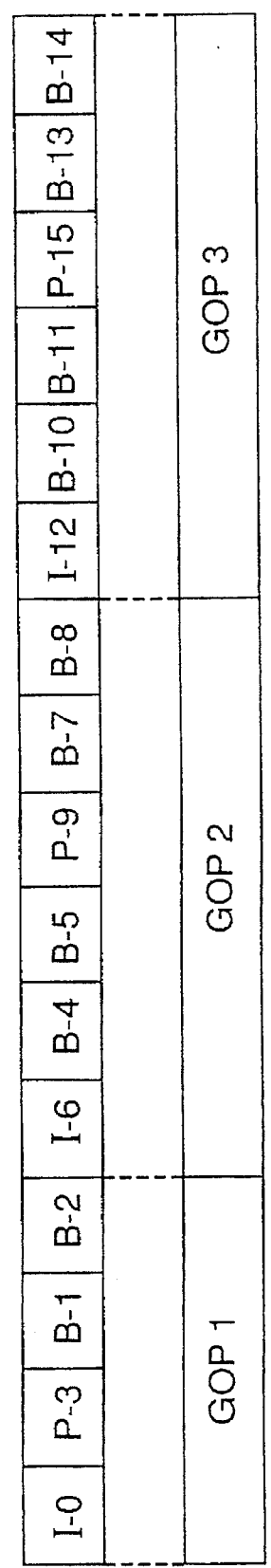
FIG. 2 is a diagram showing a method of dividing the frames into GOPs.
Figure 3A:
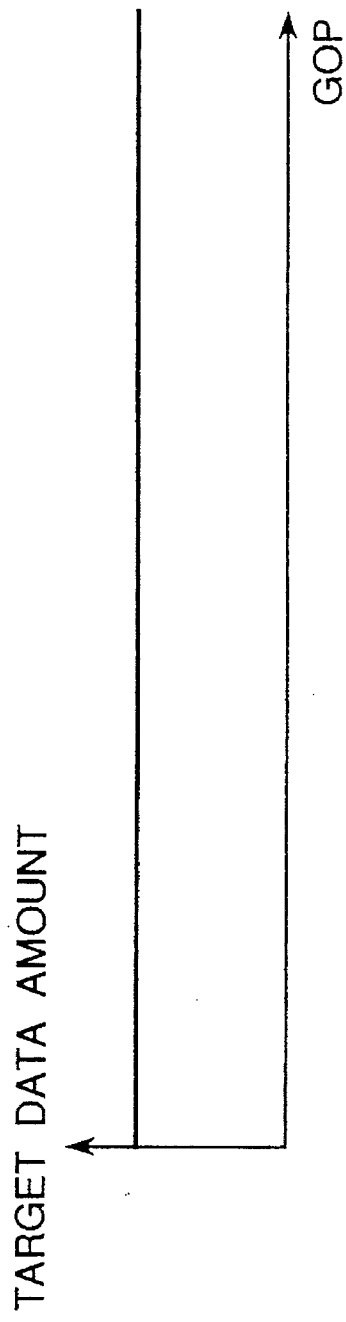
FIGS. 3A and 3B are graphs showing the target data amount of each GOP and each frame.
Figure 3B:
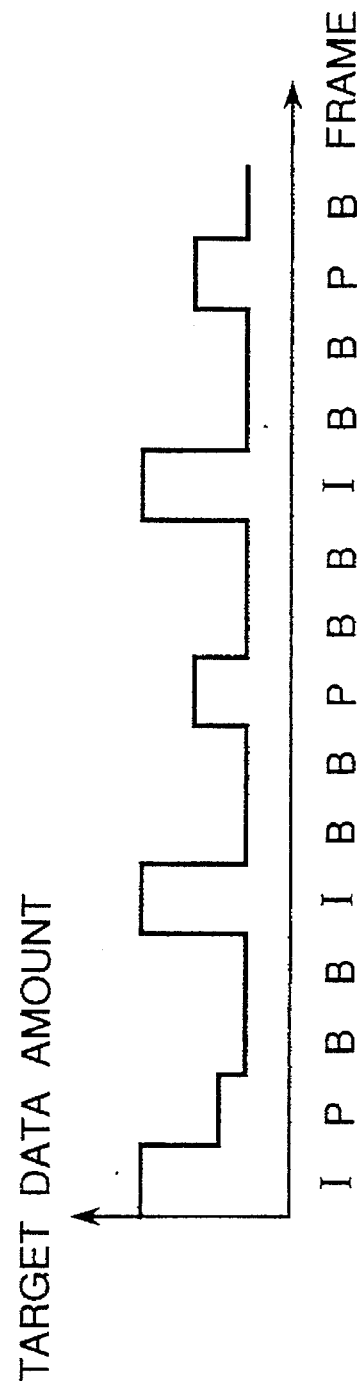
Figure 4:
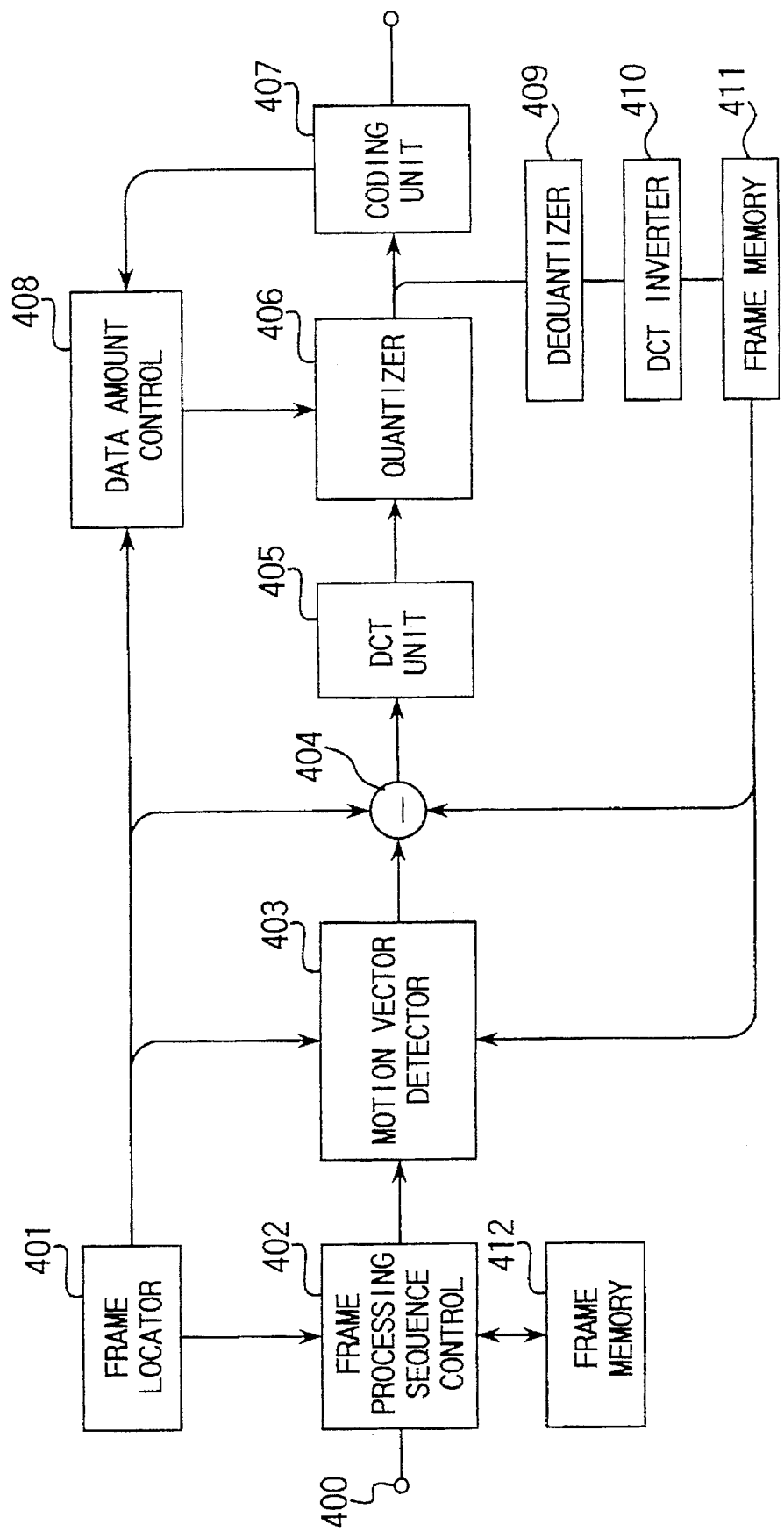
FIG. 4 is a block diagram of a coding apparatus according to the prior art.

The above arrangement except for the data amount controller 408' is substantially the same as those described above in connection with FIG. 4.

The moving picture coding apparatus according to the present invention further comprises: a switch SW1 connected to the coding unit 407 and a switch SW2 connected to the quantizer 406 which are simultaneously turned to a real line position during a first cycle operation to obtain actual coded data amount of the entire signal to be recorded on one disc under a constant compression reference value, and turned to a dotted line position during a second cycle operation for changing the compressing rate by making reference to the data obtained in the first cycle operation such that the compression rate is increased where the plain pictures are present and decreased where the complicated pictures are present; a frame data amount counter 701 for counting the compressed data amount in each frame; a GOP data amount counter 702 for counting the compressed data amount in each GOP; a frame table memory 703 for storing amount of data in each of all the frames to be recorded on one disc; a GOP table memory 704 for storing amount of data in each of all the GOPs to be recorded on one disc; a target GOP amount calculator 706 for calculating a target data amount for each of all the GOPs to be recorded on one disc; a target frame amount calculator 705 for calculating a target data amount for each of all the frames to be recorded on one disc; a constant data generator 708 for providing a constant compression reference value K to the quantizer 406 during the first cycle operation; and a pick-up drive 707 for recording the efficiently compressed coded data obtained in the second cycle operation to a disc. Instead of the target GOP amount calculator 706, a target GOP amount calculator 709 may be provided.

In operation, during the first cycle operation, switches SW1 and SW2 are turned to the real line position so that the quantizer 406 receives the constant value K from constant generator 708, and the coded data is sequentially applied to frame data amount counter 701 and to GOP data amount counter 702. During the first cycle operation, full complete video data to be recorded on the disc, such as 130 minutes long video data, is applied from the very beginning to input 400. During the first cycle operation, the quantizer 406 is quantized using a constant value K. Frame data amount counter 701 counts the amount of coded data in each frame in the 130 minutes long video data, and the GOP data amount counter 702 counts the amount of coded data in each GOP in the 130 minutes long video data. The counted results are stored in frame table memory 703 and GOP table memory 704, respectively.

Figure 15:
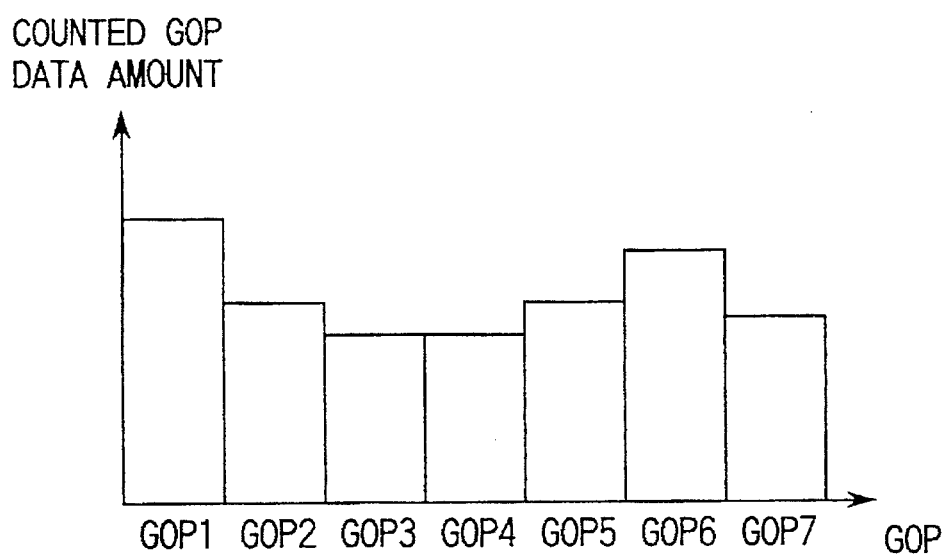
FIG. 15 is a graph used to describe the data amount generated for each GOP.
Figure 19:
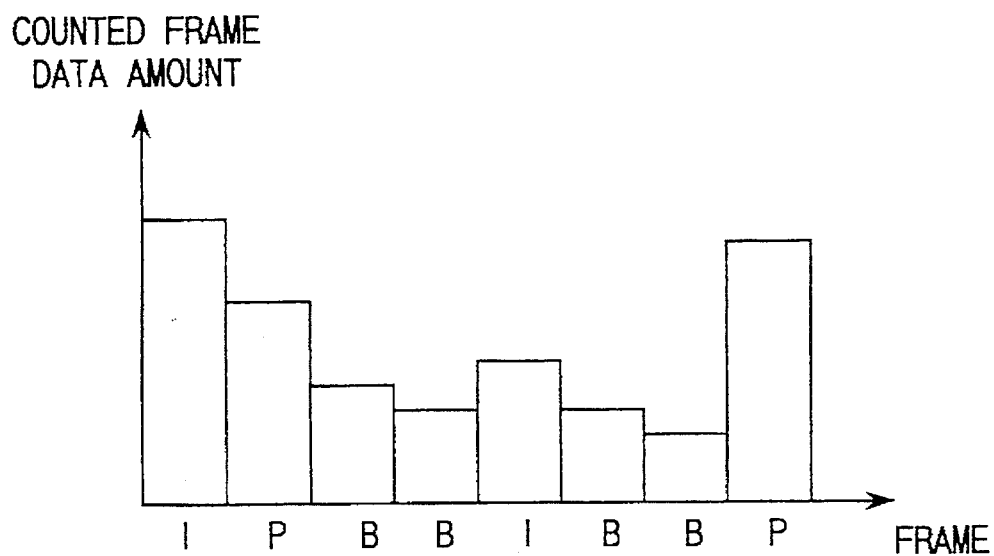
FIG. 19 is a graph used to describe the data amount generated for each GOP.

FIG. 15 shows an example how the counted GOP data amount varies for different GOPs, and FIG. 19 shows an example how the counted frame data amount varies for different frames. In FIG. 15, if the same amount of area is allocated on the disc for storing different GOPs, it is apparent that some GOPs may not use the full allocated amount of area on the disc, resulting in less effective use of the disc. As apparent from the further description, the coding apparatus of the present invention provides wider area of recording for the GOPs that have larger amount of data, and provides smaller area of recording for the GOPs that have smaller amount of data. A similar thing can be said to the frames.

Since there are 30 frames in one second, the total frames in 130 minutes will be 130×60×30 frames. Since it takes about 4 bytes to indicate the amount of coded data in each frame, the frame table memory 703 has a memory size of about 130×60×30×4 bytes. Also, if there are about 15 frames in each GOP, the GOP table memory 704 has a memory size of about 130×60×30×4/15 bytes.

In the target GOP amount calculator 706, the target data amount TARGET_GOP(i) for GOP i can be calculated from equation (4), $$TARGET\_GOP(i)=TARGET*(GOP(i)/GOP\_Total) \quad (4)$$

where GOP(i) is the counted data amount in GOP i; GOP_Total is the total data amount for all GOPs, i.e., the total coded data amount in 130 minutes video signal obtained in the first cycle operation; and 'TARGET' is maximum capacity of data that can be stored in the disc. Thus, it can be said that the target data amount TARGET_GOP(i) is the maximum allocated area in the disc for storing the coded data for GOP i. It is understood to those skilled in the art that the target data amount TARGET_GOP(i) is proportional to the counted data amount GOP(i).

According to a modification, instead of the target GOP amount calculator 706, the target GOP amount calculator 709 may be used. In this case, the target data amount TARGET_GOP(i) for GOP i can be calculated from equation (5), $$TARGET\_GOP(i)=TARGET*(FrameGOP(i)/FrameTotal) \quad (5)$$

where FrameGOP(i) is the number of frames in GOP i; FrameTotal is the total number of frames in total video signal to be recorded; and 'TARGET' is maximum capacity of data that can be stored in the disc.

In the target GOP amount calculator 706, it is also possible to calculate the TARGET_GOP(i) by the following equation (6), $$TARGET\_GOP(i)=TARGET*(GOP(i)/GOP\_Total)*WtGOP(i) \quad (6)$$

where WtGOP(i) is the weighting value for GOP i.

In the target GOP amount calculator 709, it is also possible to calculate the TARGET_GOP(i) by the following equation (7), $$TARGET\_GOP(i)=TARGET*(FrameGOP(i)/FrameTotal)*WtGOP(i) \quad (7)$$

where WtGOP(i) is the weighting value for GOP i.

To calculate the weighting value of the GOP, the percentage of still image area, the percentage of moving image area, and the magnitude of the motion vector in the moving image area are calculated in each GOP, and these calculated values are then used to calculate the weighting value. For example, if an objective is to maintain the image quality of the still image area and the percentage of the still image area to the total image area is high, the weighting can be set high; if the objective is to maintain the image quality in the moving picture area and the percentage of the moving picture area to the total image area is high, the weighting of the moving picture area can be set high. More efficient control based on the actual amount of image movement detected is also possible by using this vector information.

In target frame amount calculator 705, the target data amount TARGET_Frame(j) for the frame j in GOP i can be calculated from equation (8), $$TARGET\_Frame(j)=TARGET\_GOP(i)*Frame(j)/GOP(i) \quad (8)$$

where Frame(j) is the counted data amount in frame j. It is understood to those skilled in the art that the target data amount TARGET_Frame(j) is proportional to the counted data amount Frame(j).

In target frame amount calculator 705, it is also possible to calculate the TARGET_Frame(j) by the following equation (9), $$TARGET\_Frame(j)=TARGET\_GOP(i)*Frame(j)/GOP(i)*WtFrame(j) \quad (9)$$

where WtFrame(j) is the weighting value for frame j.

To calculate the weighting value of each frame, the percentage of still image area, the percentage of moving image area, and the magnitude of the motion vector in the moving image area are calculated in each frame, and these calculated values are then used to calculate the weighting value. For example, if an objective is to maintain the image quality of the still image area and the percentage of the still image area to the total image area is high, the weighting can be set high; if the objective is to maintain the image quality in the moving picture area and the percentage of the moving picture area to the total image area is high, the weighting of the moving picture area can be set high. More efficient control based on the actual amount of image movement detected is also possible by using this vector information.

The calculated target data amount TARGET_Frame(j) may be stored in a memory (not shown) for use in the second cycle operation, or such target data amount TARGET_Frame(j) can be calculated in the second cycle of operation but before processing the frame j.

When the above first cycle operation completes, the switches SW1 and SW2 are turned to the position shown by the dotted lines, and the same 130 minutes long video signal is applied to the input 400 from the very beginning.

In this case, the data amount control 408" further receives the target data amount TARGET_Frame(j) from the target frame amount calculator 705. As apparent from the above, the target data amount TARGET_Frame(j) is relatively large when the pictures in the video signal vary greatly with respect to time, that is when there is less time base correlations, and it is relatively small when the pictures in the video signal vary slowly with respect to time, that is when there is great time base correlations. When the target data amount TARGET_Frame(j) is large, the data amount control 408' controls quantizer 406 to quantize with small size quanta, resulting in detail data quantization. In this case, the bit rate of the bit stream as produced from the coding unit 407 will be at a high bit rate. On the other hand, when the target data amount TARGET_Frame(j) is small, the data amount control 408' controls quantizer 406 to quantize with large size quanta, resulting in rough data quantization. In this case, the bit rate of the bit stream as produced from the coding unit 407 will be at a low bit rate.

Thus, the image is coded by controlling the data amount for each frame to the target data amount. It is therefore possible to code the moving picture image using a data amount allocation determined according to the features of each scene.

A detail of the data amount control 408' and quantizer 406 is disclosed in "INTERNATIONAL ORGANISATION FOR STANDARDISATION ISO-IEC/JTC1/SC29/WG11 CODED REPRESENTATION OF PICTURE AND AUDIO INFORMATION" CCITT SG XV Working Party XV/1 Experts group on ATM Video Coding, issued Jul. 31, 1992, particularly in a section titled "Test Model 2" on pages 56–59 thereof, the entire content of which is expressly incorporated by reference herein.

The bit stream of 130 minutes coded video data as produced from the coding unit 407 is applied to the pick-up drive 707 and sequentially written on the disc using its full capacity. Accordingly, the recorded coded video data can present much clear and detail pictures than the single cycle recording method.

In the coding apparatus of the present invention, it is possible to use various coding methods, as explained below.

Figures 8, 9:
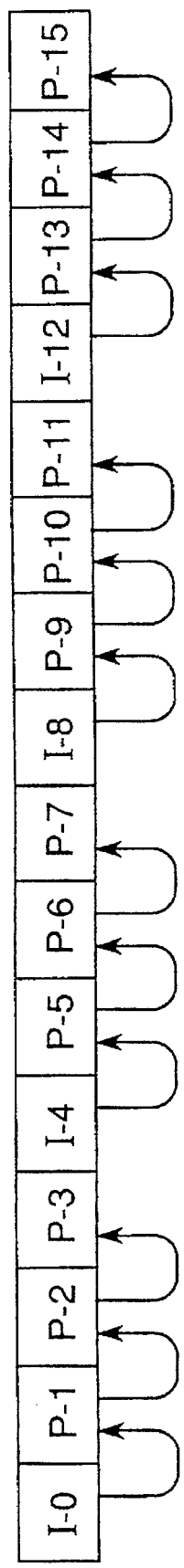
FIGS. 8, 9, 10, 11 and 12 are diagrams showing various frame coding methods employed in the apparatus of FIG. 7.

One coding method is intra-frame coding using only data correlations within each frame. This is illustrated in FIG. 8 where each frame I is an intra-frame coded frame and the number following the I indicates the frame number within the frame sequence.

Another coding method combines intra-frame coding using only data correlations within each frame and inter-frame coding using the preceding frame(s) as the predictive frames for the inter-frame coded frames. This is illustrated in FIG. 9 wherein frames I and frames P are used. Note also that in the method shown in FIG. 9 GOPs comprising four frames in an I-P-P-P configuration (the intra-frame coded frames I occur every fourth frame) are generated, but the interval at which frames I occur may vary.

Figure 10:
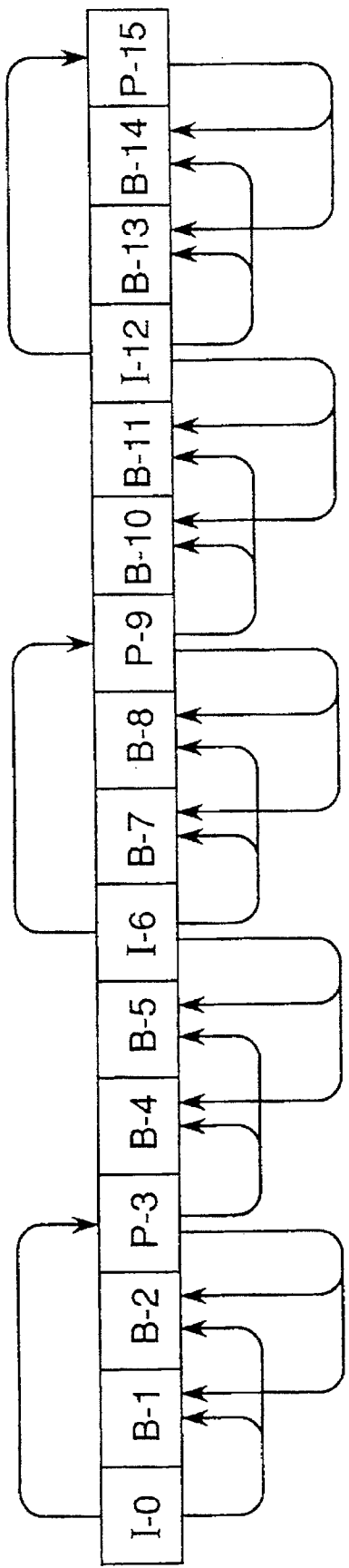

Yet another coding method generates GOPs comprising I-picture frames, P-picture frames and B-picture frames. This is shown in FIG. 10. The basic GOP configuration in this method is BBIBBP (where frames I occur every six frames and frames P occur every three frames), but other intervals for frames I and P may be used.

Figure 11:
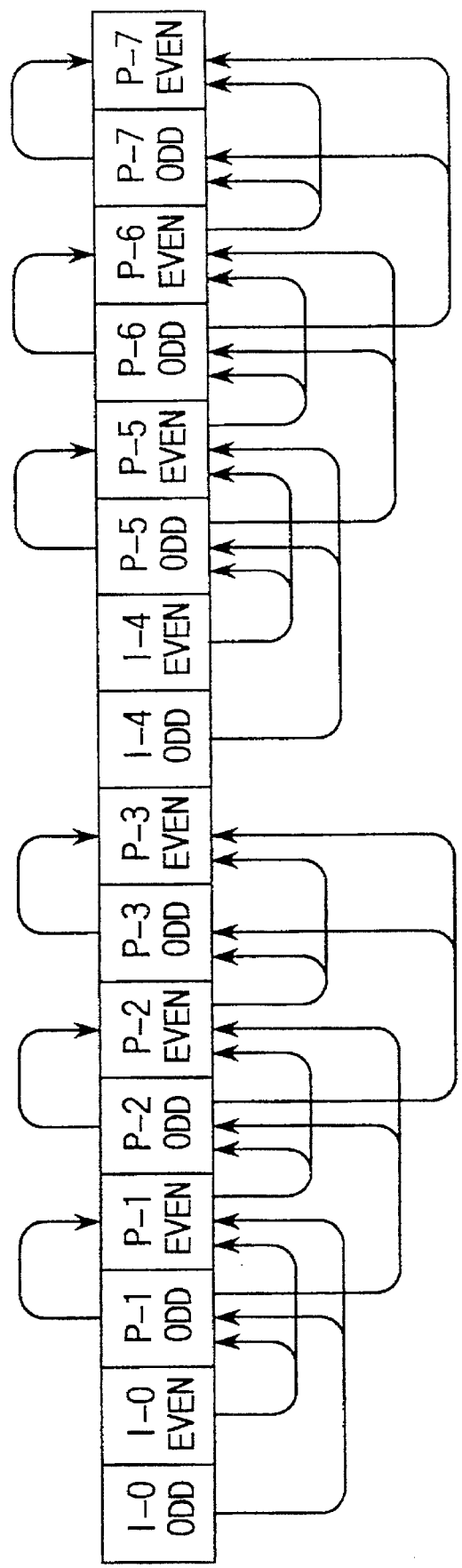

Another coding method generates GOPs comprising I-picture odd fields, I-picture even fields, P-picture odd fields, and P-picture even fields. This is shown in FIG. 11. The basic GOP configuration in this method is IPPP (where frames I occur every four frames), but other frame I intervals may be used.

Figure 12:
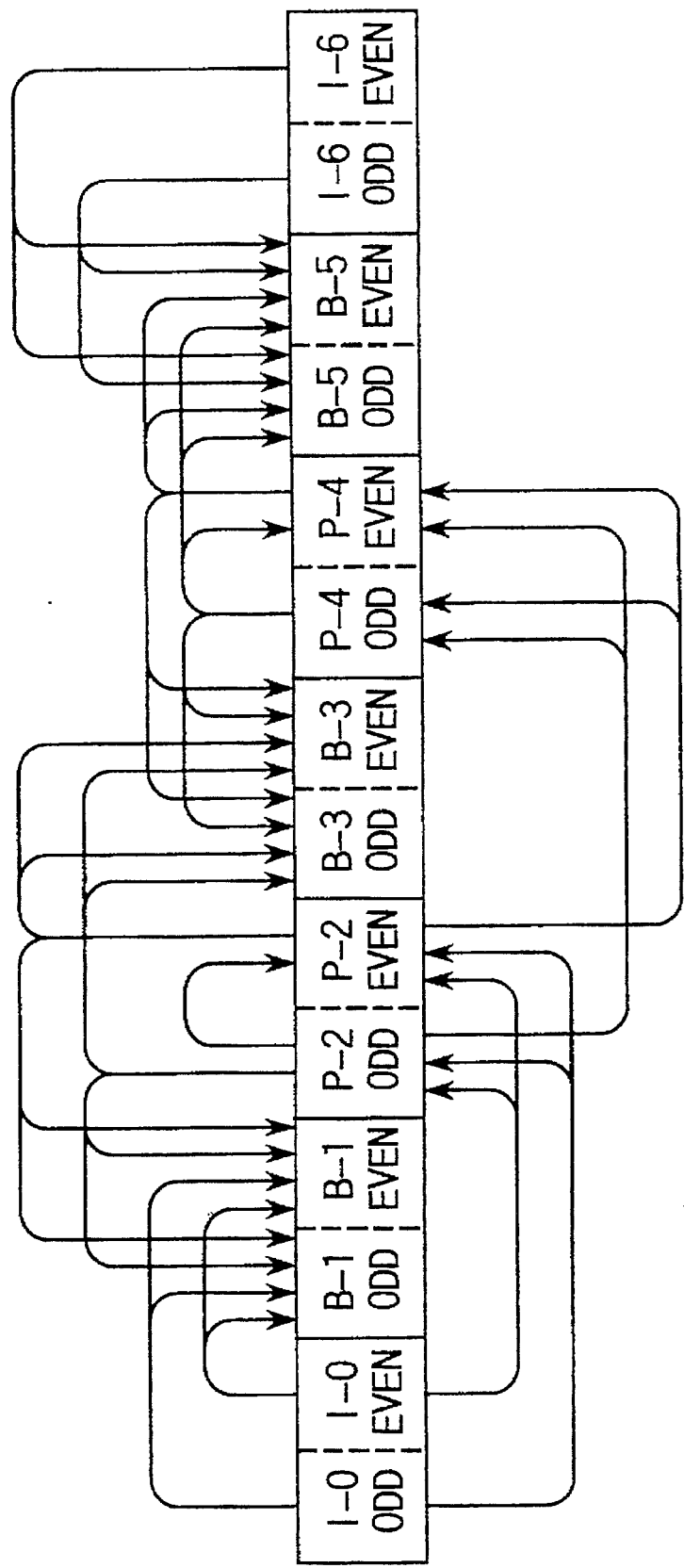

Yet another coding method generates GOPs comprising I-picture odd fields, I-picture even fields, P-picture odd fields, P-picture even fields B-picture odd fields, and B-picture even fields. This is shown in FIG. 12. The basic GOP configuration in this method is BBIBBP (where frames I occur every six frames and frames P occur every three frames), but other intervals for frames I and P may be used.

In the coding apparatus of the present invention, it is possible to use various methods of dividing the moving picture image into GOPs is to allocate the same number of frames to each GOP, as explained below.

One method of dividing the moving picture image into GOPs is to allocate the same number of frames to each GOP. For example, the number of frames in each GOP shown in FIG. 13 is six. In this case, however, the first GOP has fewer B frames (only two in this example) than the other GOPs. The advantage of this GOP allocation method is that, because there are the same number of frames in each GOP, time base control is easier when image control referenced to the time base is necessary during random data access or image editing, for example. In addition, the number of frames allocated to each GOP can be freely controlled by the application software. This is essentially a trade-off between the access unit and image quality (compression efficiency). In applications requiring a small access unit, e.g., during editing, a smaller number of frames in each GOP reduces the editing unit (time), and enables more precise editor control. The trade-off in this case is that a certain degree of compression efficiency is lost.

Another method of dividing the moving picture image into GOPs is to allocate a variable number of frames to each GOP. In FIG. 14, for example, a different number of frames is allocated to each of the GOPs shown. An effective allocation method in this case is to assign frames with a strong mutual correlation to the came GOP. In this case the coding method uses the correlation between frames in the GOP, and can generally achieve greater compression efficiency compared with methods assigning a fixed number of frames to each GOP. In other words, image quality can be improved if the data amount remains constant. This method is therefore more effective in applications for which image quality is critical and access by GOP or frame unit is not as important.

Furthermore, according to the coding apparatus of the present invention, it is possible to use a different quantizer for different type of coding methods. For the quantizers, quantization tables which differ according to the frame type as shown in FIG. 16A, 16B and 16C may be used. In this case, different quantization tables are used for frames I, P and B. The tables may be defined to obtain the same image quality for each frame processing type when the same quantization pitch is used for each frame processing type.

Another method of defining the quantization tables is shown in FIG. 17A and 17B wherein two different quantization tables are used in this case the different quantization tables are used for frames I and for frames P and B. It should be noted that these quantization tables are also defined to obtain the same image quality for each frame processing type when the same quantization pitch is used for each frame processing type.

Note that it is also possible to define only a single quantization table as shown in FIG. 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A moving picture coding method for compressing moving picture video signal to a target amount "TARGET", said moving picture video signal being divided into a plurality of groups of pictures (GOPs), each GOP comprising a plurality of frames, said method comprising:

(I) operating a first cycle operation, said first cycle operation comprising:
  (a) compressing said moving picture video signal with reference to a constant compression reference value;
  (b) counting compressed data amount "GOP(i)" in each GOP;
  (c) counting compressed data amount "Frame(j)" in each frame;
  (d) counting compressed data amount "GOP_Total" in total GOPs;
  (e) calculating a target data amount "TARGET_GOP(i)" for each GOP by a first relationship, $$TARGET\_GOP(i) \propto TARGET*(GOP(i)/GOP\_Total);$$

and
  (f) calculating a target data amount "TARGET_Frame(j)" for each frame in respective GOP by a second relationship, $$TARGET\_Frame(j) \propto TARGET\_GOP(i)*Frame(j)/GOP(i);$$

and (II) operating a second cycle operation, said second cycle operation comprising:
  (g) compressing said moving picture video signal with reference to a variable compression reference value which is relative to said target data amount "TARGET_Frame(j)",in which i represents a predetermined GOP and j represents a predetermined frame.

2. A moving picture coding method as claimed in claim 1, wherein said moving picture video signal is compressed by using intra-frame correlations.

3. A moving picture coding method as claimed in claim 2, wherein said moving picture video signal is compressed by further using inter-frame correlations.

4. A moving picture coding method as claimed in claim 2, wherein said moving picture video signal is compressed by further using inter-field correlations.

5. A moving picture coding method as claimed in claim 1, wherein said first relationship is:

$$TARGET\_GOP(i)=TARGET*(GOP(i)/GOP\_Total).$$

6. A moving picture coding method as claimed in claim 1, wherein said first relationship is:

$$TARGET\_GOP(i)=TARGET*(GOP(i)/GOP\_Total)*WtGOP(i)$$

in which WtGOP(i) is a weighting value for the corresponding GOP.

7. A moving picture coding method as claimed in claim 1, wherein said second relationship is:

$$TARGET\_Frame(j)=TARGET\_GOP(i)*Frame(j)/GOP(i).$$

8. A moving picture coding method as claimed in claim 1, wherein said second relationship is:

$$TARGET\_Frame(j)=TARGET\_GOP(i)*Frame(j)/GOP(i)*WtFrame(j)$$

where WtFrame(j) is a weighting value for the corresponding frame.

9. A moving picture coding method for compressing moving picture video signal to a target amount "TARGET", said moving picture video signal being divided into a plurality of groups of pictures (GOPs), each GOP comprising a plurality of frames, said method comprising:

(I) operating a first cycle operation, said first cycle operation comprising:
  (a) compressing said moving picture video signal with reference to a constant compression reference value;
  (b) counting compressed data amount "GOP(i)" in each GOP;
  (c) counting compressed data amount "Frame(j)" in each frame;
  (d) counting a frame number "FrameGOP(i)" in each GOP;
  (e) counting a total frame number "frame TOTAL" in total GOPs;
  (f) calculating a target data amount "TARGET GOP(i)" for each GOP by a first relationship, $$TARGET\_GOP(i) \propto TARGET*(FrameGOP(i)/FrameTotal);$$

and
  (g) calculating a target data amount "TARGET Frame(j)" for each frame in respective GOP by a second relationship, $$TARGET\_Frame(j) \propto TARGET\_GOP(i)*Frame(j)/GOP(i);$$

and (II) operating a second cycle operation, said second cycle operation comprising:
  (h) compressing said moving picture video signal with reference to a variable compression reference value which is relative to said target data amount "TARGET_Frame(j)",in which i represents a predetermined GOP and j represents a predetermined frame.

10. A moving picture coding method as claimed in claim 9, wherein said moving picture video signal is compressed by using intra-frame correlations.

11. A moving picture coding method as claimed in claim 9, wherein said moving picture video signal is compressed by further using inter-frame correlations.

12. A moving picture coding method as claimed in claim 11, wherein said moving picture video signal is compressed by further using inter-field correlations.

13. A moving picture coding method as claimed in claim 9, wherein said first relationship is:

$$TARGET\_GOP(i)=TARGET*FrameGOP(i)/FrameTotal.$$

14. A moving picture coding method as claimed in claim 9, wherein said first relationship is:

$$TARGET\_GOP(i)=TARGET*(FrameGOP(i)/FrameTotal)*WtGOP(i)$$

in which WtGOP(i) is a weighting value for the corresponding GOP.

15. A moving picture coding method as claimed in claim 9, wherein said second relationship is:

$$TARGET\_Frame(j)=TARGET\_GOP(i)*Frame(j)/GOP(i).$$

16. A moving picture coding method as claimed in claim 9, wherein said second relationship is:

$$TARGET\_Frame(j)=TARGET\_GOP(i)*Frame(j)/GOP(i)*WtFrame(j)$$

where WtFrame(j) is a weighting value for the corresponding frame.

17. A moving picture coding apparatus for compressing moving picture video signal to a target amount "TARGET", said moving picture video signal being divided into a plurality of groups of pictures (GOPs), each GOP comprising a plurality of frames, said apparatus comprising:

compressing means for compressing said moving picture video signal;

constant generator means for generating a constant compression reference value;

first counting means for counting compressed data amount "GOP(i)" in each GOP;

second counting means for counting compressed data amount "Frame(j)" in each frame;

third counting means for counting compressed data amount "GOP Total" in total GOPs;

first calculating means for calculating a target data amount "TARGET_GOP(i)" for each GOP by a first relationship, $$TARGET\_GOP(i) \propto TARGET*(GOP(i)/GOP\_Total);$$

second calculating means for calculating a target data amount "TARGET_Frame(j)" for each frame in respective GOP by a second relationship, $$TARGET\_Frame(j) \propto TARGET\_GOP(i)*Frame(j)/GOP(i)$$

in which i represents a predetermined GOP and j represents a predetermined frame; and switching means for switching between a first position during a first cycle operation for compressing said moving picture video signal using said constant compression reference value and a second position during a second cycle operation for compressing said moving picture video signal using said target data amount "TARGET_Frame(j)" as the compression reference value, said first position acquired when said constant generator means is connected to said compressing means and, at the same time, an output of said compressing means is connected to said first, second and third counting means, and said second position acquired when said second calculating means is connected to said compressing means and, at the same time, an output of said compressing means is connected to a recording medium.

18. A moving picture coding apparatus as claimed in claim 17, wherein said first relationship is:

$$TARGET\_GOP(i)=TARGET*(GOP(i)/GOP\_Total).$$

19. A moving picture coding apparatus as claimed in claim 17, wherein said first relationship is:

$$TARGET\_GOP(i)=TARGET*(GOP(i)/GOP\_Total)*WtGOP(i)$$

in which WtGOP(i) is a weighting value for the corresponding GOP.

20. A moving picture coding apparatus as claimed in claim 17, wherein said second relationship is:

$$TARGET\_Frame(j)=TARGET\_GOP(i)*Frame(j)/GOP(i).$$

21. A moving picture coding apparatus as claimed in claim 17, wherein said second relationship is:

$$TARGET\_Frame(j)=TARGET\_GOP(i)*Frame(j)/GOP(i)*WtFrame(j)$$

where WtFrame(j) is a weighting value for the corresponding frame.

22. A moving picture coding apparatus as claimed in claim 17, wherein said compressing means comprises:

discrete cosine transform means for applying a discrete cosine transformation to said moving picture video signal to produce conversion coefficients;

quantizer means for quantizing the conversion coefficients obtained by said discrete cosine transform means and for producing a compressed frame signal; and coding means for coding said compressed frame signal.

23. A moving picture coding apparatus as claimed in claim 22, wherein said moving picture video signal is compressed by using intra-frame correlations.

24. A moving picture coding apparatus as claimed in claim 22, wherein said moving picture video signal is compressed by further using first and second type inter-frame correlations.

25. A moving picture coding apparatus as claimed in claim 24, wherein said quantizer means comprises at least one quantization table.

26. A moving picture coding apparatus as claimed in claim 24, wherein said quantizer means comprises two quantization tables, respectively, for frames using intra-frame correlations, and for frames using said first and second type inter-frame correlations.

27. A moving picture coding apparatus as claimed in claim 24, wherein said quantizer means comprises three quantization tables, respectively, for frames using said first type inter-frame correlations, and for frames using said second type inter-frame correlations.

28. A moving picture coding apparatus for compressing moving picture video signal to a target amount "TARGET", said moving picture video signal being divided into a plurality of groups of pictures (GOPs), each GOP comprising a plurality of frames, said apparatus comprising:

compressing means for compressing said moving picture video signal;

constant generator means for generating a constant compression reference value;

first counting means for counting compressed data amount "GOP(i)" in each GOP;

second counting means for counting compressed data amount "Frame(j)" in each frame;

third counting means for counting a frame number "FrameGOP(i)" in each GOP;

fourth counting means for counting a total frame number "FrameTOTAL" in total GOPs;

first calculating means for calculating a target data amount "TARGET_GOP(i)" for each GOP by a first relationship, $$TARGET\_GOP(i) \propto TARGET*(FrameGOP(i)/FrameTotal);$$

second calculating means for calculating a target data amount "TARGET_Frame(j)" for each frame in respective GOP by a second relationship, $$TARGET\_Frame(j) \propto TARGET\_GOP(i)*Frame(j)/GOP(i)$$

in which i represents a predetermined GOP and j represents a predetermined frame; and switching means for switching between a first position during a first cycle operation for compressing said moving picture video signal using said constant compression reference value and a second position during a second cycle operation for compressing said moving picture video signal using said target data amount "TARGET_Frame(j)" as the compression reference value, said first position acquired when said constant generator means is connected to said compressing means and, at the same time, an output of said compressing means is connected to said first, second and third counting means, and said second position acquired when said second calculating means is connected to said compressing means and, at the same time, an output of said compressing means is connected to a recording medium.

29. A moving picture coding apparatus as claimed in claim 28, wherein said first relationship is:

$$TARGET\_GOP(i)=TARGET*FrameGOP(i)/FrameTotal.$$

30. A moving picture coding apparatus as claimed in claim 28, wherein said first relationship is:

$$TARGET\_GOP(i)=TARGET*(FrameGOP(i)/FrameTotal)*WtGOP(i)$$

in which WtGOP(i) is a weighting value for the corresponding GOP.

31. A moving picture coding apparatus as claimed in claim 28, wherein said second relationship:

$$TARGET\_Frame(j)=TARGET\_GOP(i)*Frame(j)/GOP(i).$$

32. A moving picture coding apparatus as claimed in claim 28, wherein said second relationship is:

$$TARGET\_Frame(j)=TARGET\_GOP(i)*Frame(j)/GOP(i)*WtFrame(j)$$

where WtFrame(j) is a weighting value for the corresponding frame.

33. A moving picture coding apparatus as claimed in claim 28, wherein said compressing means comprises:

discrete cosine transform means for applying a discrete cosine transformation to said moving picture video signal to produce conversion coefficients;

quantizer means for quantizing the conversion coefficients obtained by said discrete cosine transform means and for producing a compressed frame signal; and coding means for coding said compressed frame signal.

34. A moving picture coding apparatus as claimed in claim 33, wherein said moving picture video signal is compressed by using intra-frame correlations.

35. A moving picture coding apparatus as claimed in claim 34, wherein said moving picture video signal is compressed by further using first and second type inter-frame correlations.

36. A moving picture coding apparatus as claimed in claim 35, wherein said quantizer means comprises at least one quantization table.

37. A moving picture coding apparatus as claimed in claim 35, wherein said quantizer means comprises two quantization tables, respectively, for frames using intra-frame correlations, and for frames using said first and second type inter-frame correlations.

38. A moving picture coding apparatus as claimed in claim 35, wherein said quantizer means comprises three quantization tables, respectively, for frames using said first type inter-frame correlations, and for frames using said second type inter-frame correlations.

* * * * *

UNITED STATES PATENT AND TRADEMARK OFFICE
CERTIFICATE OF CORRECTION

PATENT NO. : 5,661,523
DATED : August 26, 1997
INVENTOR(S) : Y. YAMANE

It is certified that error appears in the above-indentified patent and that said Letters Patent is hereby corrected as shown below:

On the cover, in section [30], "Foreign Priority Data", line 2, change "075861" to ---6-75861---.

Signed and Sealed this

Twentieth Day of January, 1998

Attest:

BRUCE LEHMAN

*Attesting Officer*  *Commissioner of Patents and Trademarks*